Nov. 25, 1958    P. J. RAIFSNIDER    2,861,924
COMPOSITION OF MATTER AND CORROSION PREVENTION PROCESS
Filed July 23, 1956    2 Sheets-Sheet 1
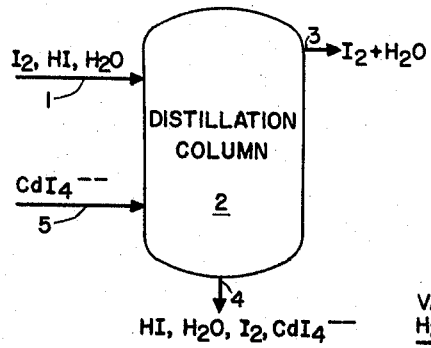
FIG. I
CONCENTRATION OF IODINE
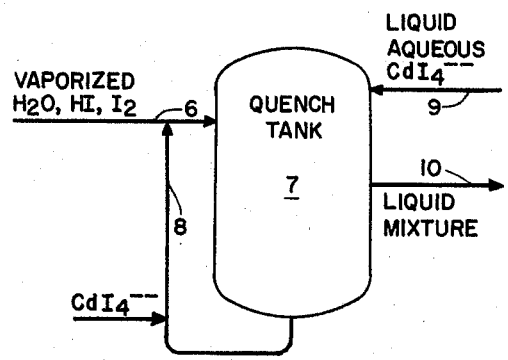
FIG. II
QUENCHING AQUEOUS HI - $I_2$
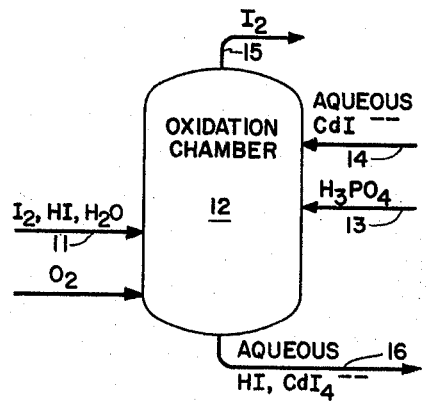
FIG. III
OXIDATION OF HI TO IODINE
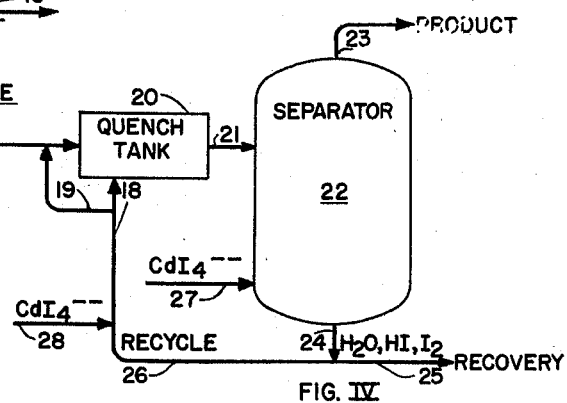
FIG. IV
PRODUCT RECOVERY
INVENTOR
PHILIP J. RAIFSNIDER
BY
HIS AGENT Nov. 25, 1958 P. J. RAIFSNIDER 2,861,924
COMPOSITION OF MATTER AND CORROSION PREVENTION PROCESS
Filed July 23, 1956 2 Sheets-Sheet 2
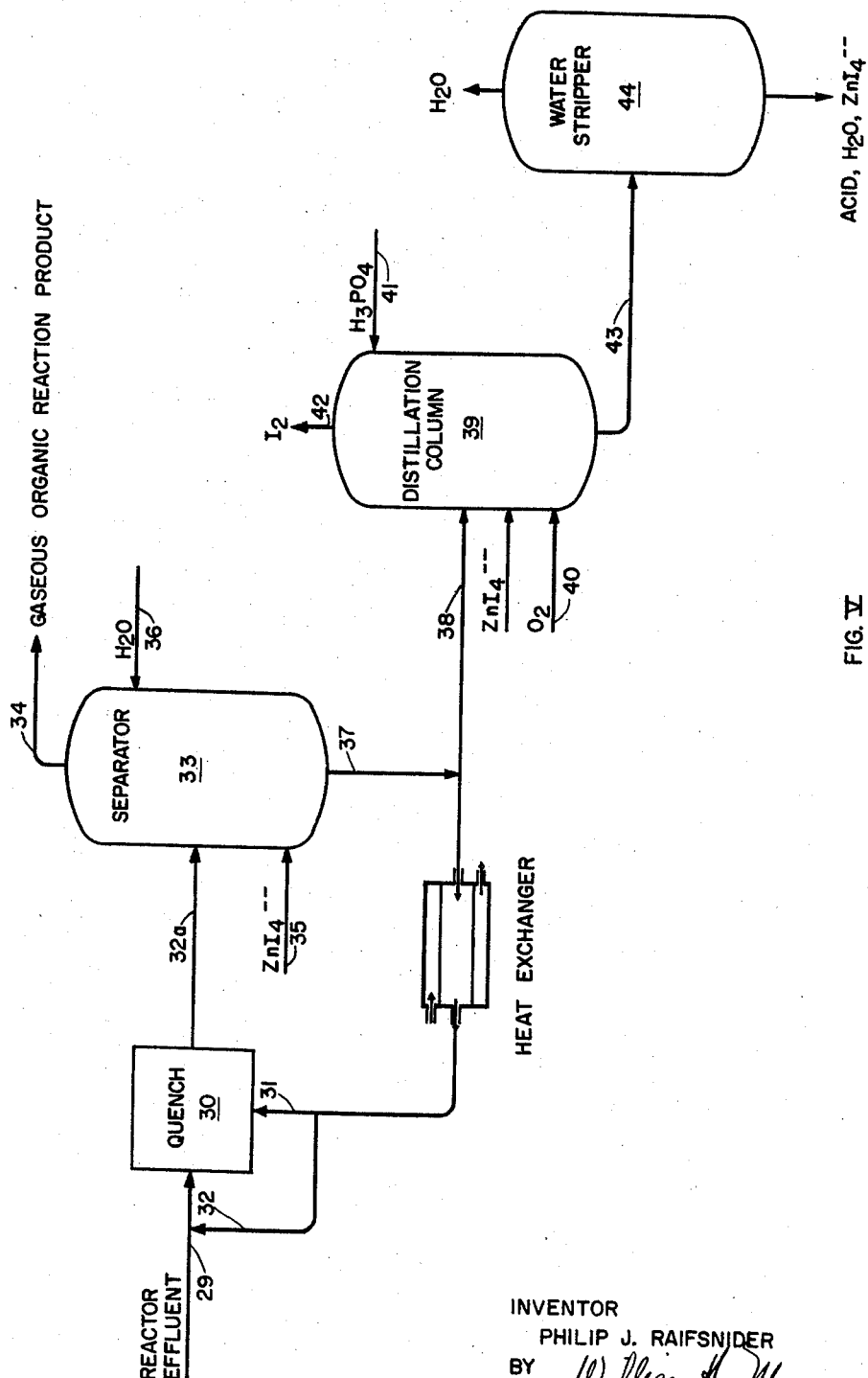
FIG. V
INTEGRATED PROCESS
INVENTOR
PHILIP J. RAIFSNIDER
BY William H. Myers
HIS AGENT United States Patent Office 2,861,924
Patented Nov. 25, 1958

2,861,924

COMPOSITION OF MATTER AND CORROSION PREVENTION PROCESS

Philip J. Raifsnider, Richmond, Calif., assignor to Shell Development Company, New York, N. Y., a corporation of Delaware Application July 23, 1956, Serial No. 599,511

7 Claims. (Cl. 202—57)

This invention is concerned with a new composition of matter. More particularly, it is directed to compositions of matter showing reduced corrosive tendencies toward metals.

Aqueous mixtures of iodine and hydrogen iodide are employed in the chemical industry in a number of conversion processes. Furthermore, aqueous hydrogen iodide is an excellent solvent for iodine, which has only a low solubility in water in the absence of hydrogen iodide. These mixtures are often encountered where aqueous systems containing iodine are utilized in the conversion of organic compounds, in which systems the iodine is converted, during said process, from elemental iodine to hydrogen iodide. Often such mixtures are handled in equipment at elevated temperatures of between about 100° F. and about 1500° F., and under varying (atmospheric or higher) pressures. Under these temperature and pressure conditions, especially when the aqueous mixtures contain relatively large proportions of iodine and hydrogen iodide, they have been found to be exceedingly corrosive with respect to almost all metals which may be normally used for the construction of process equipment. Even such metals as titanium, tantalum and platinum are corroded (under some temperature conditions) when such aqueous mixtures are in contact therewith.

Aside from the corrosion aspects of this type of aqueous system, another problem encountered in the processing thereof comprises the conversion of hydrogen iodide to iodine and the subsequent separation of iodine from aqueous hydrogen iodide or of the water from the other two components. Constant boiling mixtures are encountered which normally limit the degree of separation which may be attained by distillation methods. The latter type of process is desirable due to its normally low cost compared with separations utilizing other techniques.

It is an object of the present invention to provide new compositions of matter. It is another object of the present invention to provide new compositions of matter possessing reduced corrosive tendencies. It is a further object of the invention to improve the process of handling aqueous mixtures of elemental iodine and hydrogen iodide. Other objects will become apparent during the following description of the invention.

Now, in accordance with the present invention, it has been found that the presence of complex iodide anions of group IIB metals having atomic numbers between 30 and 48, namely, complex cadmium or zinc iodide anions in the aqueous mixtures of elemental iodine and hydrogen iodide remarkably reduces the corrosive tendencies of these compositions. Moreover, in accordance with a further aspect of the present invention, it has been found that the presence of substantial proportions of the complex anions profoundly alters the possibilities of separating iodine from aqueous hydrogen iodide solutions by means of distillation.

The presence of complex cadmium iodide anions or the corresponding zinc anions is especially effective in reducing the corrosion of metallic equipment utilized in the handling of such mixtures when the surfaces in direct contact with the mixtures contain less than about 10% by weight of iron. Preferably, the mixtures are handled in metallic equipment containing less than about 7.5% by weight of iron and comprise alloys having a high proportion of nickel. The most satisfactory species typical of such metallic surfaces is known commercially as "Hastelloy C." This comprises less than 1% each of silicon, manganese, vanadium and carbon; substantially no copper; 4.5–7% iron; 4–5% tungsten; 16–18% molybdenum; 16–17% chromium, the balance of the alloy being nickel. Even such normally resistant materials as stainless steel and the like have been found to be drastically corroded by aqueous mixtures of elemental iodine and hydrogen iodide. The present invention, therefore, is especially directed to enabling the use of an alloy of relatively moderate cost for use in the construction of handling equipment rather than necessitating the employment of such high priced materials as tantalum or platinum or the like.

Under most chemical treating conditions, the aqueous mixtures of iodine and hydrogen iodide normally comprise at least about 15% and usually at least about 20% by weight each of water, iodine and hydrogen iodide. The relative percentages of each of these materials will vary with the specific process in which the mixture is being utilized and will vary with the specific step in the particular process concerned. For example, where the initial utilization of iodine is one in which the latter is converted to hydrogen iodide and the reaction mixture is quenched with water, the mixture will be relatively high in hydrogen iodide content and, probably, in water percentages. However, in a subsequent step in the usual process, the mixtures are subjected to an oxidation treatment in which hydrogen iodide is reconverted to elemental iodine, thus reducing the proportion of hydrogen iodide in the system and increasing the ratio of elemental iodine. Furthermore, in many processes with which the present invention is concerned, a step is incorporated for the removal by one means or another of undesired proportions of water. Consequently, the proportion of water at any stage in the process may be substantially higher or lower than during other steps therein.

The complex cadmium or zinc iodide anions may be added to or formed in the aqueous mixtures of iodine and hydrogen iodide before or during any treatment step wherein experience has shown that excessive corrosion normally occurs. The figures illustrate typical applications of the present invention. Fig. I illustrates a process of concentrating or separating iodine from the subject mixtures. Fig. II illustrates a quenching process wherein a vaporized mixture is converted to a liquid mixture. Fig. III illustrates a process involving the oxidation of hydrogen iodide to iodine. Fig. IV refers to a process involving product recovery from the aqueous iodine-iodide mixtures. Fig. V is illustrative of an integrated process involving several of the treating steps just referred to.

According to Fig. I, a liquid or vaporized mixture of elemental iodine, hydrogen iodide and water is introduced by means of line 1 into the distillation column 2, in order to distill overhead a product containing a more concentrated iodine solution. However, it will be found that even when the mixture being introduced contains over 30% by weight of hydrogen iodine, the overhead product from the distillation of such a mixture consists of water containing a reduced amount of elemental iodine. Consequently, under these conditions, the bottoms product (withdrawn through line 4) is more concentrated relative to iodine than the overhead being ejected through line 3.

The conditions of the fractionation, involving, as they normally do, temperatures above about 100° F., cause excessive corrosion to occur within the distillation column and the lines and pumps and other accessory equipment utilized in connection therewith. Therefore, in accordance with the present invention, cadmium iodide complex anions formed as more fully described hereinafter are introduced into the distillation column through line 5. When the concentration of the complex cadmium iodide anions is less than about 10% by weight of the total mixture (both vaporized and condensed) present in the distillation column, the only beneficial effect noted is the substantial reduction in corrosion of the metallic surfaces in contact with both the vaporized and aqueous phases. However, when the concentration of the complex anion is increased to about 40% or more by weight of the total system present in the distillation column, a further surprising and unexpected effect occurs beyond the greatly reduced corrosion: This additional effect comprises the alteration in the distillation ratio such that much greater proportions of iodine appear in the overhead stream together with reduced proportions of water so that the distillate from the column contains a much more concentrated iodine content than either the feed being introduced or the bottoms product being carried out line 4.

Fig. II, dealing with the quenching of an aqueous hydrogen iodide-elemental iodine mixture, is concerned especially with those chemical processes in which this mixture is utilized in the conversion of organic compounds under conditions such that the mixture is ejected from the reactor in a vaporized state. Normally it is mixed with the reaction product at this point. Since it is often found that undesirable side reactions or reversion to the original products takes place at a rapid rate at elevated temperatures, it is highly desirable to quench the effluent from the reactor as soon and as quickly as possible. The temperatures of such effluents may be in the order of 250–1500° F. Consequently, in accordance with one aspect of the present invention, the effluent from any chemical reactor in which the mixture of iodine, hydrogen iodide and water is present in an at least partially vaporized state, may be passed through line 6 to the quench tank 7. A liquid and cooler aqueous phase is contacted with the vaporized mixture prior to or in the quench tank such as through line 8, wherein the line carries, for example, the relatively colder quenched liquid product obtained in the quenching process. The colder liquid product must be mixed with the vaporized mixture in an amount sufficient to convert the latter in the quench tank to the liquid state.

The proportion of quenching liquid will, of course, vary widely, depending upon the relative temperatures of the quenching liquid and of the vaporized mixture of water, iodine and hydrogen iodide. For example, if the vaporized mixture which is being quenched has a temperature in the order of 1150° F. and the cooling liquid has a temperature in the order of 140° F., it is necessary to employ about 10 volumes of the latter to quench 1 volume of the former to the liquid state. Temperatures in this order tend to corrode the lines at excessively high rates unless measures are taken to avoid such action. In accordance with the present invention, therefore, one aspect of the present invention constitutes introduction of cadmium or zinc iodide complex anions either into the quench tank or into the line 6 prior to the quench tank, thus into either lines 8 or 6. However, the cadmium iodide complex anion may be introduced in a liquid aqueous phase, preferably at the top of the quench tank through line 9, to aid in the quenching process therein. In accordance with a preferred version of this aspect of the invention, the quenched liquid is separated into two portions, one portion being recycled to quench further portions of the vaporized mixture, and the remainder being sent by means of line 10 for recovery or for other treatment.

Fig. III shows a typical arrangement of apparatus for use in the oxidation of hydrogen iodide to iodine and incorporating the corrosion protective features of the present invention. The aqueous mixture of iodine, hydrogen iodide and water enters the oxidation chamber 12 through line 11, preferably in the form of a spray but optionally as a liquid stream. Therein it is mixed with an oxidizing agent, preferably an oxygen-containing gas, such as air. Maximum agitation at the point of contact is preferred. Another optional feature in this type of process comprises the injection or incorporation of an oxidation catalyst, such as phosphoric acid or other strong mineral acid, through line 13 into the oxidation chamber. Again, it is preferred that the oxidation catalyst be injected in the form of a finely divided spray or mist. The use of phosphoric acid for this purpose is preferred, since it not only acts as an oxidation catalyst under the conditions described, but also performs a supplementary function of enhancing the corrosion inhibition in addition to the inhibition effected by the utilization of aqueous cadmium or zinc iodide complex anions. The latter are injected through line 14 into the oxidation chamber, this line being connected into the latter at any desired point. During the oxidation process, hydrogen iodide is converted into iodine and vaporized to form gaseous molecular iodine vapors which pass through line 15 to a collection point. The aqueous solution of hydrogen iodide containing minor amounts of dissolved iodine and corrosion-inhibiting proportions of cadmium or zinc iodide complex anions together with any oxidation catalyst utilized passes through line 16 for recovery or for recycling.

Fig. IV illustrates a typical application of the present invention to the quenching and separation of a reaction product including the aqueous mixtures referred to hereinbefore together with the corrosion inhibitors constituting the principal part of the present invention. The process being considered in Fig. IV contemplates the use of iodine, presumably together with hydrogen iodide and water, for the conversion of organic compounds such as hydrocarbons. The conversion involved may be, for example, the dehydrogenation of hydrocarbons to form olefins or diolefins. For example, the use of iodine together with hydrogen iodide and water for the conversion of butanes to butadiene, constitutes such a process. This method is fully explained in copending application to Raley et al., Serial No. 563,658, filed February 6, 1956. In such a process, the vaporized product comprising the organic reaction product, and an aqueous mixture of hydrogen iodide and iodine enters the quench tank 20 through line 17, being quenched in or prior to the tank by a relatively cooler liquid phase contacted therewith through lines 18 or 19 (or both). The quenched mixture resulting from this operation comprises an aqueous liquid phase together with an at least partially gaseous organic product phase. The entire contents of the quench tank pass continuously or semicontinuously through line 21 to the separator 22 wherein the gaseous portions of the product pass through line 23 to a product recovery system. The liquid products, including particularly the liquid aqueous mixture of hydrogen iodide and iodine, passes through line 24 either to recovery through connecting line 25 or to be recycled for quenching of further portions of the reaction product through line 26. The temperatures involved in such a product recovery process cause intense corrosion to occur both in the quench tank and separator, as well as in the connecting lines and pumps, etc. (not illustrated), unless measures are taken to protect the system therefrom. Consequently, in accordance with the present invention, cadmium or zinc iodide complex anions are injected into the system at such a point and in such a manner that they may be distributed throughout the illustrated pieces of apparatus, such as through line 27 or 28, or both.

Fig. V illustrates an integrated process embodying several of the corrosion-prevention and separation aspects of the present invention. The process comprises the several treating steps required for the separation and recovery of a reactor effluent wherein the effluent comprises organic reaction products resulting from conversion of organic materials with mixtures of iodine and hydrogen iodide (with optional water), which will be referred to as "reactor effluent," entering the quench tank 30 through line 29 as a vapor phase. This vapor phase is quenched prior to or in the quench tank 30 by direct contact with a relatively cooler liquid phase injected through lines 31 or 32 or both. The quenched liquid mixture together with any uncondensed organic products are transported by means of line 32a to the separator 33 wherein the gaseous products are taken overhead and sent to recovery through line 34. In order to reduce the excessive corrosion normally occurring in such a system, the zinc or cadmium iodide complex anions are introduced through line 35 into the separator 33. This may be combined with water injection or strong acid (phosphoric) injection through line 36. In this latter case, the additional presence of phosphoric acid still further enhances the corrosion protection attained in the process. It will be seen that the injection of the iodide complex anions at the point indicated results in distribution of the anion throughout the entire system, due to the fact that at least part of the condensate leaving the bottom of the separator through line 37 is recycled for the purpose of quenching hot vaporized effluent or is sent to the distillation column, as indicated.

That portion of the condensate not being recycled proceeds through line 38 to the distillation column 39 which may be modified by the addition of an oxidizing agent such as oxygen through line 40. Phosphoric acid may be sprayed into the top of the distillation column through line 41 for the purpose of catalyzing the oxidation of upcoming vaporized gases. At this point and in the distillation column, substantial proportions of hydrogen iodide are converted to iodine which is taken through line 42 as a vapor for recovery or recycling to the reactor. The aqueous bottoms product is sent by means of line 43 to the water stripper 44 for the purpose of removing the large amounts of water which have been injected either prior to, during or after the quenching operation. The bottoms product from the water stripper comprises acid (if any), hydrogen iodide (if any), water, zinc or cadmium iodide complex anions, etc., which may be further isolated and recovered or recycled from previous steps in the operation.

The concentration of the zinc or cadmium complex iodide anions (or mixtures thereof) in the system will depend upon the specific system involved, including the relative proportions of hydrogen iodide, elemental iodine and water, taken in conjunction with the temperatures encountered in the process and the metals from which the equipment in which the process is conducted is made. Normally, where corrosion prevention or reduction is the sole object and where temperatures vary between about 100° F. and about 1500° F., the concentration of the complex iodide anions will be between about 0.5% and about 10% by weight, based on the total aqueous mixture present. If, however, the complex iodide anion is employed for the additional purpose of altering the relative volatility of iodine and water in the distillation column, such as distillation column 39 of Fig. V, then the anion should be present in a concentration of about 30–70% by weight of the total aqueous mixture present. This proportion may be reduced substantially if phosphoric acid is introduced, since it has been found that amounts of phosphoric acid in the order of about equal amounts relative to the aqueous mixture radically alter the relative volatilities of iodine, hydrogen iodide and water. If amounts of phosphoric acid in excess of 75% (preferably 75–95%) based on the total fluids present in the system are present during a separation step as in column 39 of Fig. V, both hydrogen iodide and iodine will be emitted from line 42 overhead while the proportion of water coming overhead will be negligible or at least greatly reduced.

The complex zinc or cadmium iodide anions may be preformed or formed in situ, as desired. The addition of metallic zinc or metallic cadmium to aqueous hydrogen iodide results in the direct formation of the complex anions. Alternative means of preparing these materials comprise the addition of zinc or cadmium oxides (or mixtures of the same) to aqueous solutions. Mixtures of the two complex anions may be employed.

As indicated hereinbefore, the presence of the zinc or cadmium iodide complex anions in the aqueous systems of hydrogen iodide and elemental iodine alter the relative volatilities of the components, particularly when the anion is present in amounts greater than about 30% by weight of the total components. This is indicated by the following series of experiments, wherein a 50% aqueous solution of hydrogen iodide was modified by the presence of 17% by weight of iodine and subjected to distillation in a distillation column. Under these conditions, it was found that the overhead stream contained one-fourth as much iodine as water, while the constant boiling azeotrope eventually attained contained 57.3% hydrogen iodide. The original system was modified by the addition thereto of zinc iodide complex anions in an amount of about 46% by weight of the total, calculated as $ZnI_2$. Under these conditions, it was found that 1.2 parts of iodine distilled overhead for every part by weight of water, while the constant boiling azeotrope of hydrogen iodide and water did not change appreciably. In a third experiment, the proportion of zinc iodide complex anion was increased to a figure of 57% by weight of the total mixture, calculated as $ZnI_2$. Under these conditions, the overhead vapors contained 1.35 parts of iodine for every part of water and the azeotrope of hydrogen iodide and water distilling overhead was substantially unaltered.

The corrosion protective features of the use of the zinc or cadmium iodide complex anions is evident at much lower concentrations of the anion than are required for alteration in the iodine-water relative volatilities. For example, when a solution comprising 31% by weight of hydrogen iodide, 36% by weight of elemental iodine and 33% water was heated at 150° F., in the presence of Hastelloy C metal strips, a rate of corrosion of about 160 mils per year was experienced. However, when this same mixture was modified by the addition thereto of 2% by weight of zinc iodide complex anions or the corresponding cadmium anions the rate of corrosion dropped to less than about 2 mils per year.

I claim as my invention:

1. In the process of condensing a mixture of water, elemental iodine and hydrogen iodide, which mixture normally causes excessive corrosion of metallic surfaces containing less than about 10% by weight of iron and at least about 49% by weight of nickel in contact therewith at temperatures in excess of about 100° F., from vapor state to liquid state, the improvement comprising contacting the vaporized mixture with a sufficient amount of a relatively colder condensed aqueous phase to effect the condensation, said aqueous phase containing zinc iodide complex anions in an amount sufficient to substantially minimize the corrosion of metallic surfaces in contact therewith.

2. In the process of handling aqueous mixtures of elemental iodine and hydrogen iodide at temperatures above about 100° F., whereat excessive corrosion of metallic equipment of metallic surfaces containing less than about 10% by weight of iron and at least about 49% by weight of nickel in contact with said mixtures occurs, the improvement comprising adding complex cadmium iodide anions to said mixtures in amount sufficient to substantially minimize corrosion of the metal surfaces.

3. A process for minimizing corrosion of metallic surfaces containing less than about 10% by weight of iron and at least about 49% by weight of nickel in contact with an aqueous solution of elemental iodine and hydrogen iodide at temperatures above about 100° F. which comprises adding to said solution a corrosion-inhibiting amount of complex zinc iodide anions.

4. A composition comprising a condensed aqueous mixture of at least 15% by weight each of water, elemental iodine and hydrogen iodide and a corrosion-inhibiting proportion of a complex group IIB metal iodide anion soluble in said mixture, said group IIB metal being of the group consisting of cadmium and zinc.

5. In the process of separating gaseous hydrocarbons from a condensed aqueous mixture of elemental iodine and hydrogen iodide, wherein said hydrocarbons and aqueous mixture are confined by metallic surfaces containing less than about 10% by weight of iron and at least about 49% by weight of nickel at temperatures in excess of 100° F., whereby gaseous hydrocarbons are removed overhead and the aqueous mixture is separated therefrom as a bottoms product, and the surfaces are corroded under said conditions, the improvement comprising adding to the aqueous mixture prior to separation of hydrocarbons therefrom a corrosion-inhibiting proportion of complex cadmium iodide anions.

6. In the process of separating iodine from an aqueous mixture comprising at least 20% by weight each of water and hydrogen iodide, wherein the iodine and aqueous mixture are fractionally distilled, the improvement comprising conducting the distillation in the presence of more than about 20% by weight, based on the total iodine and aqueous mixture, of complex zinc iodide anions, whereby the concentration of iodine relative to water in the overhead fraction is substantially increased.

7. In the process of handling aqueous mixtures of elemental iodine and hydrogen iodide at temperatures above about 100° F., whereat excessive corrosion of metallic equipment of metallic surfaces containing less than about 10% by weight of iron in contact with said mixtures occurs, the improvement comprising adding complex group IIB metal anions to said mixtures in amount sufficient to substantially minimize corrosion of the metal surfaces, said group IIB metal being of the group consisting of cadmium and zinc.

References Cited in the file of this patent
UNITED STATES PATENTS

| | | |
|---|---|---|
| 629,092 | Ross | July 18, 1899 |
| 752,844 | Kinnear | Feb. 23, 1904 |
| 801,489 | Uthemann | Oct. 10, 1905 |
| 2,411,483 | Wachter | Nov. 19, 1946 |
| 2,452,812 | Wachter | Nov. 2, 1948 |
| 2,653,177 | Kemp | Sept. 22, 1953 |

OTHER REFERENCES

Protective Coatings for Metals, Burns and Schult, Reinhold Publishing Corp., 1939.